(12) United States Patent
Kaul

(10) Patent No.: US 6,939,610 B1
(45) Date of Patent: Sep. 6, 2005

(54) THERMAL INSULATING COATING FOR SPACECRAFTS

(75) Inventor: Raj K. Kaul, Hampton Cove, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 51 days.

(21) Appl. No.: 10/212,564

(22) Filed: Jul. 31, 2002

(51) Int. Cl.$^7$ ................................................ B32B 5/16
(52) U.S. Cl. .................. 428/403; 428/407; 428/323; 428/327
(58) Field of Search ................................. 428/323, 327, 428/920, 403, 407; 106/14.05, 14.34, 14.35, 106/15.05

(56) References Cited

U.S. PATENT DOCUMENTS

| | | | |
|---|---|---|---|
| 5,178,902 A | | 1/1993 | Wong et al. |
| 5,290,904 A | * | 3/1994 | Colvin et al. .................. 428/68 |
| RE34,880 E | * | 3/1995 | Salyer ........................ 106/660 |
| 5,405,661 A | | 4/1995 | Kim et al. |
| 5,409,777 A | | 4/1995 | Kennedy et al. |
| 5,562,989 A | | 10/1996 | Statz |
| 5,804,297 A | * | 9/1998 | Colvin et al. ................ 428/327 |
| 6,077,597 A | * | 6/2000 | Pause ......................... 428/218 |
| 6,099,894 A | * | 8/2000 | Holman .................... 427/126.3 |
| 6,146,709 A | | 11/2000 | Katz et al. |
| 6,217,993 B1 | * | 4/2001 | Pause ......................... 428/218 |
| 6,270,836 B1 | * | 8/2001 | Holman .................... 427/126.3 |
| 6,317,321 B1 | * | 11/2001 | Fitch et al. .................. 361/700 |
| 6,514,362 B1 | * | 2/2003 | Zuckerman et al. .......... 156/79 |

OTHER PUBLICATIONS

Hayes et al, "A Model for Encapsulated Phase Change Material in a Conductive Media", Department of Aerospace Engineering and Engineering Mechanics, University of Texas, 1999.*

Mulligan et al., "Microencapsulated Phase Change Material Suspensions for Heat Transfer in Spacecraft Thermal Systems", Journal of Spacecraft and Rockets, vol. 33, No. 2, Mar.-Apr. 1996.*

* cited by examiner

*Primary Examiner*—H. Thi Le
(74) *Attorney, Agent, or Firm*—James J. McGroary; Norman L. Wilson, Jr.

(57) ABSTRACT

To protect spacecraft and their contents from excessive heat thermal protection systems are essential. For such thermal protection, metal coatings, ceramic materials, ablative materials, and various matrix materials have all been tried, but none have been found entirely satisfactory. The basis for this thermal protection system is the fact that the heat required to melt a substance is 80 to 100 times larger than the heat required to raise its temperature one degree. This led to the use herein of solid-liquid phase change materials. Unlike conventional heat storage materials, when phase change materials reach the temperature at which they change phase they absorb large amounts of heat without getting hotter. By this invention, then, a coating composition is provided for application to substrates subjected to temperatures above 100° F. The coating composition includes a phase change material.

12 Claims, 2 Drawing Sheets

THERMAL INSULATING COATING FOR SPACECRAFTS

ORIGIN OF THE INVENTION

The invention described in this patent was made by an employee of the United States Government and may be manufactured and used by or for the Government for governmental purposes without the payment of any royalties.

CROSS-REFERENCE TO A RELATED APPLICATIONS

There are no applications related to this application.

BACKGROUND OF THE INVENTION

Thermal protection systems (TPS) for space vehicles are seldom in the public eye. The general public typically hears only about heat shields and shuttle tiles, and then merely during a manned spacecraft mission. The fact is, thermal protection systems are essential for the successful launch and operation of all spacecraft, whether manned or unmanned.

The obvious goal of a thermal protection system is to keep excessive heat from destroying or damaging a vehicle or its contents. Thermal protection is not as important in vehicles that are designed to be expendable, or to function only for a short time. However, this is not generally the case in today's economy where costs require that vehicles and accessories be reused, even though most electronic equipment is susceptible to permanent damage when exposed to high temperatures. In fact, in order to meet mission objectives a TPS is subject to other constraints in addition to heat requirements. As an example the components must be protected with a minimal weight increase. As a whole, then, the TPS cannot be optimized from every point of view. Hence, neither a best thermal protection system, nor a universal criterion for rating the performance of a TPS is possible.

Without effective temperature thwarting, rockets of the future may never offer routine low-cost access to space. For today's space shuttle fleet, various heat protection approaches have been utilized. In addition to ceramic and metal coatings, various matrix materials have been tried on the various orbiters. They have been chosen for their weight efficiency, and constancy at high temperatures, which can approach 3,000 degrees Fahrenheit.

One early approach to thermal protection has been the use of ablators. Ablative materials, such as cork, Teflon, Lucite, fiberglass, nylon, and urethane, work by absorbing great amounts of heat through permanent phase changes. During their phase changes such ablators form an ash or char layer which acts as an insulator to protect the substrate underneath, but the substrate nevertheless continues to decompose and outgas. The gaseous products from decomposition percolate through the char to cool effectively the surface by transpiration. The char also helps block convection heating. In addition, in high heat flux environments, the char will sublime. Charring ablators do provide multiple levels of protection. However, they cannot be reused, and they tend to have high drag coefficients. More important, when the ash deteriorates or wears away and comes off, it tends to erode other areas of the space vehicle, even adversely affecting the tiles. Further, when a vehicle exceeds hypersonic speeds in the atmosphere, the surrounding air ionizes and creates a plasma sheath that tends to block telemetry and communication. Materials that ablate exacerbate this phenomenon.

In the light of the foregoing discussion it is to be appreciated that thermal protection materials are, and always have been, among the most crucial and critical technologies involved in access to space. There are not that many areas where materials technology is so visibly enabling. As evidence of the fact that metals, ceramics and ablative materials are not entirely satisfactory, an estimated forty thousand hours of maintenance is spent between shuttle flights on refurbishing and replacing components. There is, then, a clear need for a non-ablative thermal protection system for space transportation systems. An object of this invention is to provide such a TPS.

SUMMARY OF THE INVENTION

One means for storing thermal energy involves the utilization of the latent heat of phase change materials. Usually the heat of melting is utilized. The heat required to melt a substance is 80 to 100 times larger than the heat required to raise its temperature one degree. The energy density of heat storage becomes in the order of 0,1 MWh/m3. The use of liquid-vapor phase change further increases the energy density. The thermal protection system of this invention utilizes this innovative concept to minimize the temperature gain in a substrate. Provided herein is a coating composition for the substrate which includes a phase change material. Phase change materials (PCMs) are latent thermal storage materials. They use chemical bonds to store and release heat. The thermal energy transfer occurs when a material changes from a solid to a liquid, or from a liquid to a solid. This is called a change in state, or "phase." Solid-solid PCMs are also known. They absorb and release heat (latent heat) in the same manner as solid-liquid PCMs, but they do not change into a liquid state under normal conditions. They merely soften or harden.

This invention involves the use of solid-liquid PCMs. Initially, these solid-liquid PCMs perform like conventional heat storage materials. Their temperatures rise as they absorb heat energy. Unlike conventional heat storage materials, when PCMs reach the temperature at which they change phase (their melting points) they absorb large amounts of heat without getting hotter. By this invention, then, a coating composition is provided for application to substrates subjected to temperatures above 100° F. The composition includes a resinous binder having a quantity of microspheres incorporated in that binder. A sufficient quantity of microspheres is suspended in the binder to form at least a forty percent solids coating composition by weight. Preferably the binder composition will be loaded with 50 to 60 weight percent of the phase change material. Even higher loadings can be used where the binding properties of the particular resin permit it. The microspheres are microscopic particles in the form of a solid phase change material encapsulated in an inert shell such as a ceramic or polymeric shell. The encapsulated phase change material is one having a melting point in the range of the temperatures to which the substrate is subjected. It can function as a heat absorber during its phase change to protect the substrate.

DETAILED DESCRIPTION OF THE INVENTION

Figure 1:
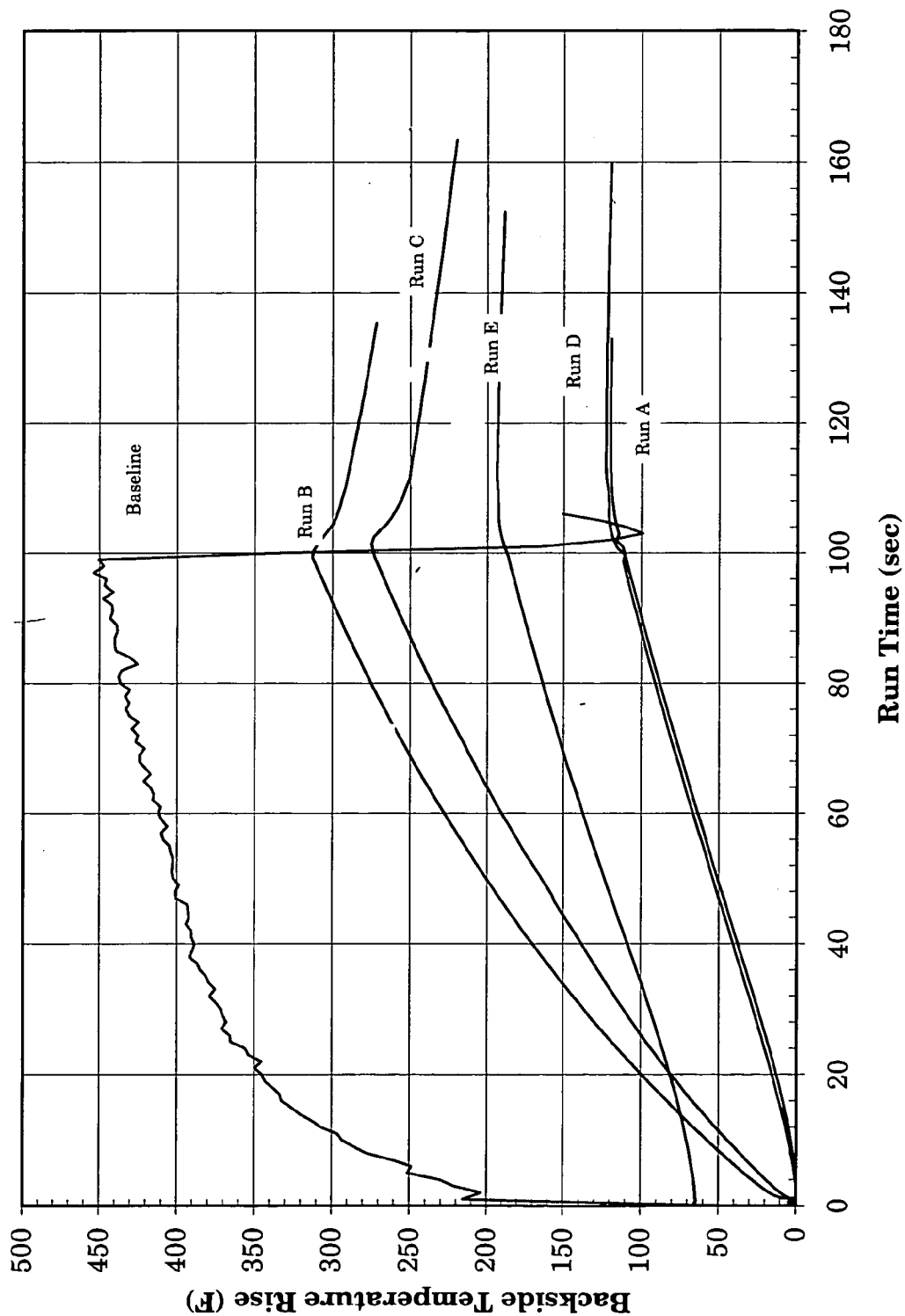
FIGS. 1 and 2 are representative plots showing back-side temperature rise as a function of time when the front-side of a panel coated by the composition according to the invention is exposed to a constant heat source.

Heretofore an important use of phase change materials has been their use as barriers to thermal energy in clothing as exemplified in the Barbara Pause patents assigned to Outlast Technologies, examples being U.S. Pat. No. 6,217,993 and U.S. Pat. No. 6,077,597. A clothing layer can be coated or a fiber can be manufactured which incorporates the PCM. Herein coating compositions are prepared for use on external surfaces of space flight hardware, satellites, shuttles, space stations, space based telescopes and the like. High temperatures on external surfaces of such space apparatus are a result of aerothermal heating during launch. Because the aerothermal heating is of short duration the coatings provided herein are particularly suited for protecting exterior surfaces of such apparatus. The coating compositions herein are able to absorb large amounts of heat with a minimal gain in temperature, They will normally be applied to the substrate by known coating techniques in 25 to 100 mil films for some purposes, but in up to one-fourth to one inch coatings for other purposes such as space vehicles and fuel tanks.

Having described the coating compositions contemplated herein in general terms it remains to consider the formulations which will coat the substrates on which they will be applied. Preliminarily it is to be understood that both binders for coating compositions, and phase change materials are well known in the art, and hence need not be discussed at length herein. It is the selection, based on specific parameters, of these two components from within the well known groups which is important herein. However since specific compounds depend upon end use such specific compounds cannot be delineated without end use parameters. However, the parameters can be set forth as guidelines. Proper selection of the bonding agent, for instance, will depend upon the substrate. It is known that some binders adhere more securely to one metal or plastic than to another. Knowledge about binders for specific substrates is available in the art. Likewise since this invention is concerned with high temperatures, phase change materials which change states at low temperatures would be undesirable. Here again the compound is to be matched with its end use. High melting point phase change materials will be preferred with melting points being at or near the temperature to which the substrate will be subjected.

Referring now to specific compositions, thermosetting resins for binders used in coating compositions are even more widely known than phase change materials. Any of these well known epoxies, polyesters, polyimides, furanes, polyurethanes, phenolics, allyl and amine resins, and even the early alkyd, urea-aldehyde and melamine resins are within the purview of this invention. The most widely used resins are epoxide resins, usually glycidyl ethers of polyhydric phenols obtained by reacting a polyhydric phenol in an excess of epichlorohydrin with sodium hydroxide. Such polyhydric phenols include bisphenol A, that is, (p,p'-dihydroxy diphenyl propane), resorcinol, hydroquinone, 4,4'-dihydroxybenzophenone, 4,4'-dihydroxy biphenyl and novolak resins containing more than two phenol moieties linked through methylene bridges. Other glycidyl ethers of polyhydric phenols are prepared by reacting diepoxides with a dihydric phenol. Still other epoxide resins are polymers and copolymers of vinyl polymerizable epoxides, such as allyl glycidyl ether, and glycidyl methacrylate. Preferred epoxide resins for use herein are glycidyl polyethers of polyhydric phenols, particularly, the diglycidyl polyethers of bisphenol A. In particular, those bisphenol A-based epoxide resins having weights per epoxide group in the range of about 550 to about 6000 are useful, with the most useful having weights per epoxide group in the range of about 850 to 2000.

The curing agents which are mixed with the epoxy compositions to form the thermosetting resin coats include aliphatic and aromatic polycarboxylic acids, polyamines, tertiary amines, tertiary amine salts, e.g., metaphenylene diamine, methylene dianiline, benzyl dimethylamine hydrochloride, benzyl trimethyl ammonium chloride, etc. Additional desirable curing agents include melamine, benzoquanamine, dicyandiamide, and the like. Also included are amides and polyalkoxy methylol melamines, particularly the hexamethoxymethyl melamines and the blocked diisocyanates. The epoxy resin curing agent will be added, as is well known in the art, either based on equivalence or on weight, in the range of about 1 to 25 percent, by weight, based on the epoxy resin, preferably about 1 to 10 percent, by weight. Liquid epoxide resins are desirable because they require no solvent and are easier to mix when making the coating composition. Polyurethane curing agents are often aromatic, for example toluene diisocyanate, or hexamethylene diisocyanate. Epoxide resins are preferred because film flexibility can be determined more readily by proper selection of the curing agent.

For use as binders in coating compositions silicone resins also come into consideration. They are desirable because of their heat stability. Silicone resin coatings can be continuously exposed to temperatures in the 600° F. range, and intermittently to temperatures as high as 1000° F. Examples of silicone resins are polysiloxanes having alkyl and phenyl substituents such as polydimethyl siloxane and polydiphenyl siloxane. Phenyl groups extend the thermal stability of the coating composition. Fluorine atoms also improve heat resistance. Hence fluorosilicone binders are also contemplated herein. Whether or not a solvent is included in any of the binders will be determined by viscosity requirements and method of application.

Phase change materials are now becoming almost as well known as binders for coating compositions. They are described in the various Mark Holman patents assigned to Frisby Technologies, examples being U.S. Pat. No. 6,099,894, U.S. Pat. No. 6,197,836, U.S. Pat. No. 171,647, and U.S. Pat. No. 6,270,836 which are incorporated herein by reference. In the Holman patents a microcapsule is defined as a unicellular, hollow particle, having a peripheral wall or shell enclosing or surrounding a single, hollow cavity, space or void. The particle is so small that it requires means such as an optical microscope for purposes of measuring its dimensions, which range from 1.0 to 2,000 microns. Preferably, diameters of from 10 to 200 microns will be used. The sol-gel method and other methods for preparing the encapsulated phase change materials are also described the prior art patents.

The phase change materials preferred by Holman are paraffinic hydrocarbons having from ten to thirty carbon atoms in a straight chain, and such paraffinic phase change materials, available as Thermasorb from Frisby Technologies, are used in the specific examples herein. Additional phase-change materials are aliphatic alcohols and esters such as 2,2-dimethyl-1,3-propanediol (DMP), 2-hydroxymethyl-2-methyl-1,3-propanediol (HMP) and methyl palmitate. Still other PCMs are also available, examples being sodium sulfate decahydrate, calcium chloride hexahydrate, and such fatty acids and esters, polyethylene glycols, the solid state series of pentaerythritol, that is pentaglycerine, and neopentyl glycol, as well as quaternary ammonium clathrates and semi-clathrates, along with salt hydrides. Some appropriately melting metals and alloys can also be used.

In discussing end use parameters it was brought out that the temperature is the function of the application. Hence from among the wide variety of phase change materials it is preferred to select those with high latent heats, say 70 to 100 BTUs/lb. As an example of the importance of these temperatures, the temperature of the substrate of the Solid Rocket Booster is not to exceed 250° F. if the Solid Rocket Booster is to be reused. The booster reaches these temperatures in about 100 seconds. Lower substrate temperatures during the flight lessen structural changes in the aluminum or alloy caused by high temperatures, and hence lengthen the service life. Since the yield and ultimate strength of frequently used aluminum alloys is a function of temperature, as temperature increases the strength goes down. This in turn limits the allowable designs. Inasmuch as virtually all Launch Vehicle structures are fabricated using aluminum alloys because of their lower weights, lower substrate temperatures are important, even for one-time use vehicles. In case of Satellites and telescopes average substrate temperatures, and hence the melting points of the phase change materials should be in the range of 70° F. to 150° F.

SPECIFIC EMBODIMENTS

To further illustrate the invention specific examples will now be given. In these examples, all parts and percentages are by weight unless otherwise specified. In addition, it is frequently desirable to include in the coating composition additional additives, for instance, a UV protecting agent, a fire retardant, or a corrosion inhibitor. In some of the examples this has been done. In addition, in some cases ethanol has been included for achieving a more workable composition. Since it quickly evaporates during the curing of the film, it was not included in the phase change material percent solids calculations. In the examples the number following Thermasorb is its peak transition temperature. It should also be emphasized that although the curing agent is included in the examples which follow, it will be incorporated in the mix prior to the application of the coating compositions as is normal in the case of thermosetting resins.

Example 1

In a suitable reaction vessel equipped with a mechanical stirrer, 72 parts of an epoxide resin made from bisphenol-A and epichlorohydrin and having a molecular weight of less than 400 and an epoxy equivalent in the range of 175 to 200, were mixed with 19 parts of an amine curing agent sold under the trademark Ancamine 1768. To the mix 1 part of a UV protecting agent and 9 parts of the fire retardant, diethyl-N,N-bis(2-hydroxyethyl) amino methyl phosphate were added to form 100 parts of a resinous binder, Coating Composition C.

Example 2

To form a coating composition of this invention, 46 parts of ethyl alcohol were stirred into Coating Composition C. Then 138 parts of a paraffinic hydrocarbon phase change material having a peak transition temperature of 122° F., available as Thermasorb 122, were added to form approximately a 58 percent solids coating composition excluding the alcohol which evaporates, Coating Composition A.

Example 3

To form a coating composition of this invention, 46 parts of ethyl alcohol were stirred into Coating Composition C. Then 138 parts of a paraffinic hydrocarbon phase change material having a peak transition temperature of 122° F., available as Thermasorb 122, were added to form approximately a 58 percent solids coating composition, Coating Composition D.

Example 4

To form another coating composition of this invention, following Example 2, 138 parts of a paraffinic hydrocarbon phase change material having a peak transition temperature of 111° F., available as Thermasorb 111, were added to form approximately a 58 percent solids coating composition, again excluding the alcohol as in the previous examples, Coating Composition E.

Example 5

To form still another coating composition of this invention, following Example 2, 85 parts of a paraffinic hydrocarbon phase change material having a peak transition temperature of 175° F., available as Thermasorb 175, were added to form approximately a 46 percent solids coating composition, Coating Composition F.

Example 6

Following the procedure of Example 1 100 parts of a resin binder was prepared by blending 65 parts of a polyurethane resin, 26 parts of hexamethylene diisocyanate as a curing agent, and as additives, 0.3 part of a silicon oil and 0.7 part of the UV agent, and 8 parts of the phosphate fire retardant. To this resin binder 100 parts of a paraffinic hydrocarbon phase change material having a peak transition temperature of 175° F., available as Thermasorb 175, were added to form a 50 percent solids coating composition, Coating Composition G.

Panels coated in various film thicknesses with film-forming compositions of this invention and others were tested to determine the effectiveness of the coatings under launch conditions. The coating compositions were applied by spraying, using a Bink's 2001 spray gun with a 68 fluid tip and a pressure pot. The spraying pressure was 15 psi. After being spray coated the panels were allowed to stand for 24 hours at room temperature to allow the resin to cure. The panels coated for these tests were 12 in. by 18 in., one-fourth inch thick Standard 2219 aluminum alloy flat plates. In view of the long times Shuttle orbiters often stand on the launch pads prior to lift-off they are subject to lightning strikes. Accordingly, each panel was initially exposed to a simulated lightning strike to determine the effect of lightning on the thermal performance of the coating material applied to each panel. The lightning strikes were effected in a Transportable Lightning Effects Simulator Facility which is an element of the U.S. Army Redstone Technical Test Center's test facilities. The lightning strikes were achieved by an initial strike current capacitor bank consisting of forty capacitors.

Panels that had previously undergone simulated lightning strikes were then tested at a constant heat rate of 9.1

BTU/ft$^2$-sec for 100 seconds (launch conditions). These tests were conducted in the NASA Improved Hot Gas Facility (IHGF). The IHGF is a nominal Mach 4.1 aerothermal tunnel that burns a lean mixture of hydrogen and air to produce temperatures up to 2200° F. at total pressures up to 200 psia. The tunnel has a nominal 16 by 16 by 40 inch test section designed primarily for testing of thermal protection coating materials. The panel surface temperature was measured using a thermal imaging, non-contact, temperature measurement device (Inframetrics Model 760 Scanning Radiometer) traceable to NIST standards, and having an accuracy of "2% of full scale. The thermal image data was stored on a VHS videocassette for later post-processing. The combustor conditions are such that they verify that the panels are all subjected to similar heating conditions in the IHGF and any differences in substrate temperatures are due to differences in the coating materials. Using thermocouples the backside temperatures were also measured on the test panels. The temperature data obtained was normalized to show the net temperature rise rather than the gross temperature. This eliminates artificial differences in temperature caused by different starting temperatures.

Figure 2:
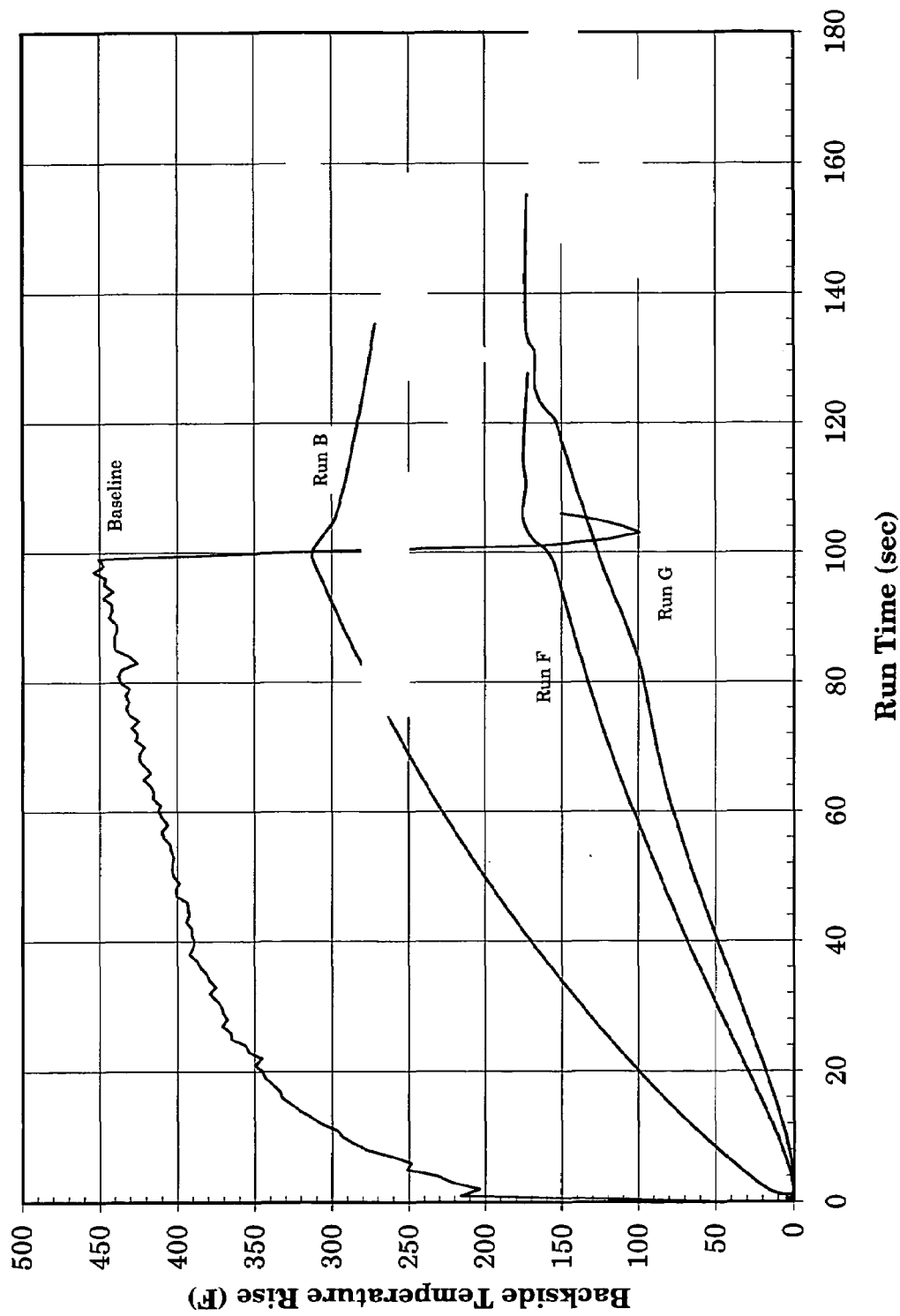

Turning now to FIGS. 1 and 2, over one hundred plates were exposed to a constant heat rate of 4.9 BTU/ft$^2$-sec for 120 seconds to determine the effectiveness of coating compositions containing phase change materials. The curves shown in FIGS. 1 and 2 are representative of the results obtained with the one hundred panels. The Baseline panel used for comparison was actually tested for 100 seconds instead of 120 seconds, which explains why its substrate temperature plot ends abruptly at 100 seconds as shown in the two figures. The Baseline curve was included in both FIG. 1 and FIG. 2 for the purpose of comparison since that curve represents a normal rise in temperature without a coating. It will be appreciated too that the thicker the coating, the lower the substrate temperature rise, regardless of the exposure. The film thicknesses of coatings applied to the panels herein varied from 35 to 85 mils. The percent loading (percent solids) of the micro-encapsulated phase-change material was in the range of 46 to 58 percent. And the peak transition temperatures of the phase-change materials were in the range of 111° F. to 175° F. The curves in FIGS. 1 and 2 can be identified as follows;

Baseline Panel with no coating
Run B Panel with 4 mil epoxy resin-based top coat
Run C Panel with 69 mil film of epoxy resin of Ex. 1 (no phase-change material)
Run A Panel with 70 mil epoxide coating of Ex 2 (phase-change material)
Run D Panel with 70 mil epoxide coating of Ex 3 (phase-change material)
Run E Panel with 70 mil epoxide coating or Ex 4 (phase-change material)
Run F Panel with 50 mil epoxide coating of Ex 5 (phase-change material)
Run G Panel with 61 mil polyurethane coating of Ex 6 (phase-change material)

Referring more specifically to the figures, in FIG. 1 it can be seen that the baseline peak temperature was 450° F. With the 4 mil epoxy resin-based top coat the maximum temperature rise was still above 300° F. The 69 mil epoxy resin coating without a phase-change material, prepared according to Example 1 lowered the peak temperature rise to about 225° F. The two epoxide coatings including 58 percent solids phase-change materials whose peak transition temperatures were 122° F. lowered the maximum temperature rise to less than 125° F. Note that the curves for Runs A and D are almost identical and barely separately distinguishable. Similar improvements in temperature rise are shown in FIG. 2, including the improvement obtained with a polyurethane resin binder, which with less phase-change material still reflected a maximum temperature rise to less than 200° F.

It can be seen by these tests that the coatings of this invention such as the epoxy coatings are particularly desirable for use on the Space Shuttle Solid Rocket Boosters, and the polyurethane coatings of the invention are well suited for use on the intertank area of the External Tank. The economic ups and downs of reusable rocketry largely depends on beat-the-heat protection systems. Without a robust, temperature-thwarting, and easily maintainable outer skin, rockets of the future may never offer routine, low-cost access to space. From the foregoing results it can be seen that by the practice of this invention the phase-change coating materials absorb a large quantity of heat without a change in substrate temperature. As non-ablative coatings, the compositions herein are particularly valuable for use on the external fuel tanks or solid rocket boosters during shuttle launches, in addition to other shuttle components, as well as on satellite, space station, and space based telescope structures.

In the light of the teachings of this invention it can be seen that various modifications and substitutions can be made without departing from the invention. As an example the films can be heat cured, say for six hours at 130° F. instead of being allowed to stand at room temperature. It will be apparent, for example, that various ground based applications will come to mind wherein apparatus is to be subjected to extreme temperatures, such as in the foundries, steel mills, house roofing and the like. It will be apparent too that the selection of the curing agent will be a choice depending upon desired coating properties such as flexibility, durability, chemical resistance, and the like. Further, in addition to alcohols and ketones various a aromatic, aliphatic and chlorinated solvents can be added to the coating composition to obtain the consistency desired for the method of coating application. It will also be appreciated that virtually any method of application can be used in forming the coating on the substrate. Similarly, it is to be understood that the PCM selected will be matched with the temperature to which the substrate is to be subjected. Likewise the selection of the resin to be used as a binder will depend upon ultimate properties desired as well as upon the substrate. Whether to use additives such as fire retardants, corrosion inhibitors, UV protectors, and the like, will also be a matter of choice depending upon end use. For instance, as a corrosion inhibitor, in lieu of zinc dust, 2 parts of titanium dioxide were included in the coating compositions herein. Such ramifications and variations are deemed to be within the scope of this invention.

What is claimed is:

1. A film-forming composition adapted, when applied as a coating to external surfaces of space apparatus, to protect those external surfaces from aerothermal heat which the external surfaces are subjected to during spacecraft missions, the film-forming composition including as a resinous binder a thermosetting resin adapted to adhere to the external surfaces during spacecraft missions, the thermosetting resin having incorporated therein microspheres of phase change materials having latent heats in the range of 70 to 100 BTUs/lb capable of storing the aerothermal heat to which the external surfaces are subjected, microspheres being microscopic particles of the phase change material encapsulated in an inert shell, the thermosetting resin being loaded with a quantity of phase change microspheres to form at least a forty percent solids coating sufficient so that the phase change material in an applied film stores the aerothermal heat.

2. The film-forming composition of claim 1 wherein the inert shell is a ceramic shell.

3. The film-forming composition of claim 1 wherein the inert shell is a polymeric shell.

4. The film-forming composition of claim 1 wherein the resinous binder is an epoxide resin.

5. The film-forming composition of claim 1 wherein the resinous binder is a polyester.

6. The film-forming composition of claim 1 wherein the resinous binder is a phenolic resin.

7. The film-forming composition of claim 1 wherein the resinous binder is a polyurethane.

8. The film-forming composition of claim 1 including a fire retardant additive.

9. The film-forming composition of claim 1 including an anticorrosion additive.

10. The film-forming composition of claim 1 including an ultra violet ray protection additive.

11. The film-forming composition of claim 1 including a solvent.

12. A spacecraft having exterior surfaces subjected to aerothermal heat during spacecraft missions, the spacecraft having applied to those exterior surfaces as a coating a film-forming composition including as a resinous binder a thermosetting resin adapted to adhere to the exterior surfaces during spacecraft missions, the applied thermosetting resin having incorporated therein microspheres of phase change materials having latent heats in the range of 70 to 100 BTUs/lb capable of storing aerothermal heat to which the exterior surfaces are subjected, microspheres being microscopic particles of the phase change material encapsulated in an inert shell, the quantity phase change microspheres in the thermosetting resin being sufficient so that the phase change microspheres in the applied film are able to store the aerothermal heat to which the exterior surfaces are subjected.

* * * * *